(12) United States Patent
Costa-Requena et al.

(10) Patent No.: US 7,421,732 B2
(45) Date of Patent: Sep. 2, 2008

(54) SYSTEM, APPARATUS, AND METHOD FOR PROVIDING GENERIC INTERNET PROTOCOL AUTHENTICATION

(75) Inventors: Jose Costa-Requena, Helsinki (FI); Jukka Immonen, Espoo (FI); Markus Aholainen, Pirkkala (FI); Juha Hietasarka, Suinula (FI); Ossi Korhonen, Vantaa (FI); Jussi Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 672 days.

(21) Appl. No.: 10/429,918

(22) Filed: May 5, 2003

(65) Prior Publication Data

US 2004/0225878 A1 Nov. 11, 2004

(51) Int. Cl.
*G06F 7/04* (2006.01)
(52) U.S. Cl. .......................................... 726/3
(58) Field of Classification Search ............... 726/2–3; 380/247; 713/168
See application file for complete search history.

(56) References Cited

U.S. PATENT DOCUMENTS

| | | | |
|---|---|---|---|
| 6,651,168 B1 * | 11/2003 | Kao et al. ................... 713/185 |
| 6,678,700 B1 * | 1/2004 | Moore et al. ................ 707/200 |
| 6,785,823 B1 * | 8/2004 | Abrol et al. ..................... 726/7 |
| 7,017,051 B2 * | 3/2006 | Patrick ........................ 726/12 |
| 2002/0140542 A1 * | 10/2002 | Prokoski et al. ............. 340/5.52 |
| 2003/0046586 A1 * | 3/2003 | Bheemarasetti et al. ..... 713/201 |
| 2003/0079144 A1 * | 4/2003 | Kakemizu et al. ........... 713/200 |
| 2004/0208151 A1 * | 10/2004 | Haverinen et al. .......... 370/338 |

* cited by examiner

*Primary Examiner*—Emmanuel L Moise
*Assistant Examiner*—Ali S Abyaneh
(74) *Attorney, Agent, or Firm*—Hollingsworth & Funk, LLC

(57) ABSTRACT

Generic Internet Protocol (IP) authentication is provided by authentication server (134). Application Programming Interface (API) (310) detects the protocol type of an incoming authentication request and invokes one of a number of authentication mechanisms (318-326) depending on the protocol type detected. A localized repository (520) is provided to store Subscriber Identity Module (SIM) information and other algorithm data as required to facilitate the authentication session.

19 Claims, 7 Drawing Sheets

SYSTEM, APPARATUS, AND METHOD FOR PROVIDING GENERIC INTERNET PROTOCOL AUTHENTICATION

FIELD OF THE INVENTION

This invention relates in general to providing generic Internet Protocol (IP) authentication, and more particularly, to providing authorization and authentication for an IP Multimedia Subsystem (IMS).

BACKGROUND OF THE INVENTION

The mobile industry has experienced a period of exceptional growth during the last several years, where mobile voice and simple SMS text messaging have provided some of the primary drivers for that growth. As the next generation of mobile network growth evolves, services will be offered, where rich content as well as voice will be transported throughout a combination of mobile and internet environments, using an integrated IP network layer.

An ALL-IP network enables seamless network integration of different access options, e.g., broadband, mobile Internet, fixed Internet, and existing mobile systems, into a single IP layer. As such, all communication services may be carried over a single network infrastructure, thus enabling the integration of voice, data, and multimedia services. Carriers on the ALL-IP networks will glean a number of important benefits as well, including cost savings, scalability, flexibility, efficient network operations, and new revenue opportunities.

The ALL-IP communication system is to be fully compliant with the Third Generation Partnership Project (3GPP) release 5 and 6 standards, with open interfaces and IP Version 6 (IPv6) support. Accordingly, Session Initiation Protocol (SIP) is introduced as a key ingredient in providing support for multimedia services across the Web and Internet domain for IP enabled terminals. For a consumer, for example, this means integrated voice, video, and browsing experience in a single call. With SIP, numerous applications can be implemented which combine traditional telephony with messaging and multimedia. In particular, SIP applications and services may be combined in order to complement and supplement each other in order to provide a more fulfilling and reduced workload experience for the consumer. As applications and services become integrated, they each become readily available to supplement each other's shortcomings. Additionally, however, authentication and authorization of users that access those applications and services becomes increasingly challenging.

Authenticating the identity and authorization of users with a high degree of certainty in open environments has been one of the most significant functional problems encountered when developing services accessible over the Internet. Many different schemes for establishing the desired result have been devised, with varying degrees of certainty, security and user friendliness. Properties of every good identity authentication and authorization mechanism should at least possess, for example: correctness; preservation of anonymity; speed; resistance to attack; low expense; user friendliness; and universality. In order to preserve anonymity, the user authentication and authorization mechanisms should not have direct access to the security credentials of each user. They should, rather, be implemented via Subscriber Identity Module (SIM) or Application Protocol Data Unit (APDU) servers that have direct communications with the associated operating systems.

Within IMS, however, varying signaling protocols exist for authenticating the user, where each protocol may implement its own algorithm, such as the Advanced Encryption Standard (AES) or Digest. The signaling protocols that require authentication when accessing the network include Session Initiation Protocol (SIP), HyperText Transfer Protocol (HTTP), IP via Wireless Local Area Network (WLAN), Extensible Authentication Protocol (EAP), etc. Currently, these IMS protocols implement their own security solutions, where access to the security credentials is facilitated through the use of separated systems such as the Public Key Infrastructure (PKI).

As the ALL-IP communication system develops, a consolidated authentication system is desired, which is able to adapt to the specific bearer mechanism being used. Additionally, the consolidated authentication system should be able to perform multiple algorithms and create the appropriate messages that encapsulate the results of those algorithms depending upon the bearer protocol that requested the authentications. Thus, the consolidated authentication system should have access to the SIM information and other algorithm data within the same platform in order to perform the right calculation. The different applications installed on the platform should register the security algorithms, protocols and credentials that are required for performing each authentication procedure. Once registered, the security information may be accessed by the requesting party from the platform. Such an access would then result in the execution of the correct algorithm and correct result delivery encapsulated into the correct envelope as required by the requesting entity.

Accordingly, there is a need in the communications industry for a system, apparatus and method that facilitates consolidated authentication. The consolidated authentication should have the capability to service authentication procedures from any number of IP bearer protocols and return the results of the authentication procedures in the correct format as required by the requesting entities.

SUMMARY OF THE INVENTION

To overcome limitations in the prior art, and to overcome other limitations that will become apparent upon reading and understanding the present specification, the present invention discloses a system, apparatus, and method for providing generic authentication services in an IP network.

In accordance with one embodiment of the invention, a method is provided for facilitating generic authentication within an IP network. The network comprises receiving an authentication request, detecting an authentication mechanism associated with the received authentication request, selecting one of a plurality of authentication modules in response to the detected authentication mechanism, and accessing data that is required to support the authentication module.

In accordance with another embodiment of the invention, an authentication system is provided. The authentication system comprises a plurality of network elements each employing a different authentication protocol. The authentication system further comprises an authentication server arranged to provide authentication service in response to received authentication requests from the network elements. The authentication server further comprises a data server arranged to provide data to the authentication server to support the authentication service. The authentication service performed depends upon the authentication protocol employed by the requesting network element, which is detected by an Application Programming Interface (API) that allows the applications to utilize the services provided by the authentication system.

In accordance with another embodiment of the invention, a server within a network is provided to authenticate network elements within an IP network. The server comprises means for receiving authentication requests having various protocol types from the network elements, means for detecting the various protocol types, means for invoking an authentication mechanism depending upon the protocol type of the authentication request, and means for accessing data in support of the authentication of the network elements.

In accordance with another embodiment of the invention, a computer-readable medium having instructions stored thereon which are executable by an authentication server for facilitating authentication of network elements is provided to perform steps comprising receiving authentication requests having various protocol types from the network elements, detecting the various protocol types, invoking an authentication mechanism depending upon the protocol type of the authentication request, and accessing data in support of the authentication of the network elements.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system, apparatus, and method to provide authorization and authentication services within an IP based network. Identification and authentication are critical functions for practically all services offered by the IP based network. A consumer and a client, for example, need to be identified and authenticated before gaining access to services offered by mobile networks, WLANs, corporate intranets, and valuable Wireless Application Protocol (WAP) and Web sites on the Internet. It is equally important that the consumer trust the service, so that no sensitive information is provided to unknown parties.

The present invention provides a mechanism through which a number of protocols and standards for authentication may be serviced. The mechanism according to the principles of the present invention is intended to provide an open standard and API for identification and authentication for a variety of service types. In so doing, the present invention enables subscribers to: identify themselves with an appropriate level of traceability and security; disclose some of their private data to various services in a controlled and confidential manner so that personal services can be provided; authorize services and other agents to use brokers; and achieve single sign-on.

The identification and authentication system provides client authentication that has adequate security to satisfy the carrier or service provider policies for service access or for the transaction being undertaken. Additionally, the identification and authentication system provides management and authorization tools to simplify provisioning and configuration of the consumer accounts and devices. Further, the identification and authentication system provides development tools to aid smooth deployment of the authentication and identification system and to enable third-party application developers to use the system more easily.

Figure 1:
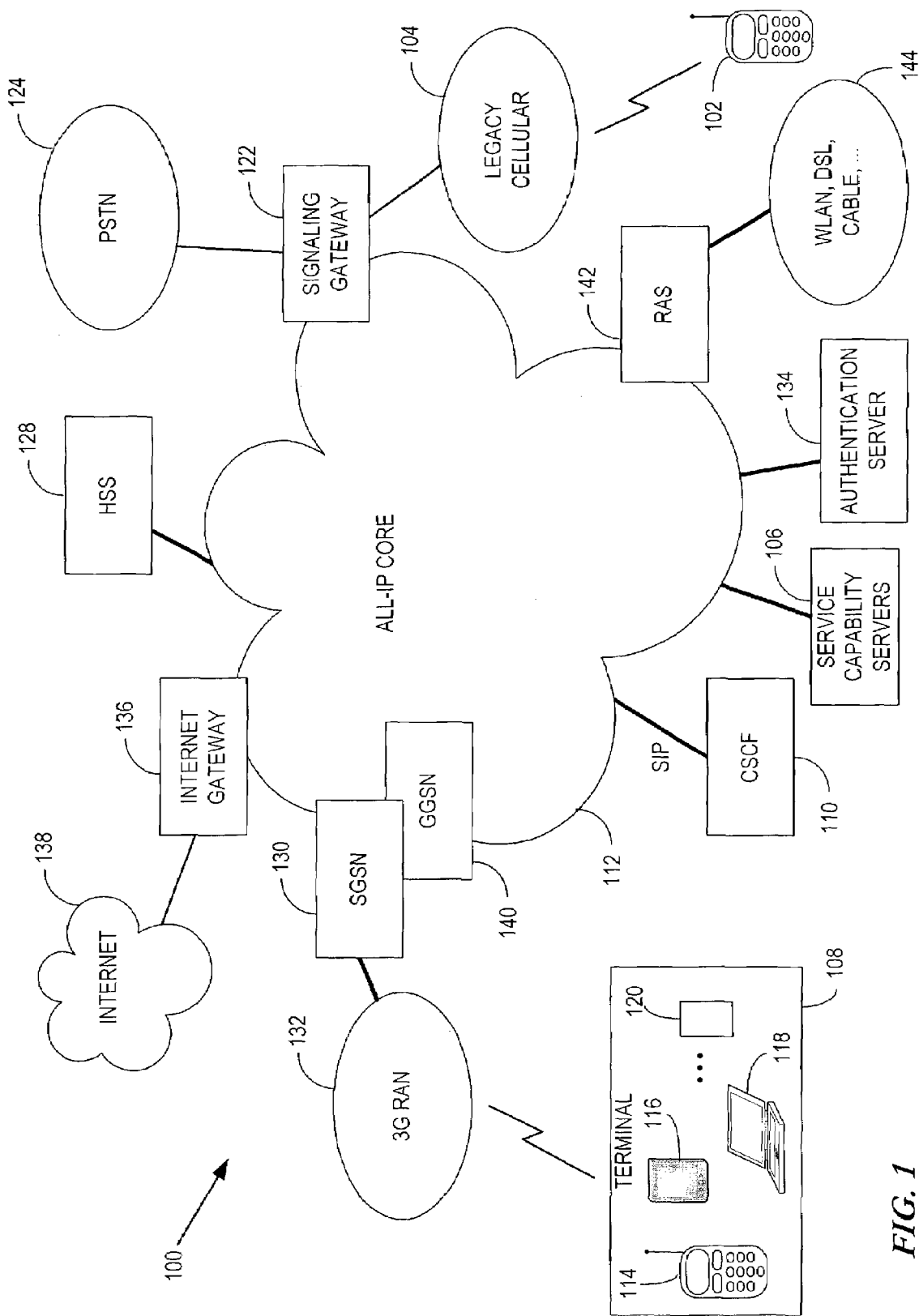
FIG. 1 illustrates and exemplary system architecture in accordance with the present invention.

An exemplary system level diagram of ALL-IP system 100 architecture in accordance with the present invention is shown in FIG. 1. ALL-IP core 112 provides the common, IP based signaling core utilized by system 100 to integrate various fixed, mobile, and Internet networks. ALL-IP core 112 allows all communication services to be carried over a single network infrastructure, thus enabling the integration of voice, data, and multimedia services. Further, ALL-IP core 112 allows network resources to be used more efficiently, where increased capacity may be deployed as necessary to meet demand.

ALL-IP system 100 is optimized to support multimedia services, where Call State Control Function (CSCF) 110 implementing SIP is a key ingredient in providing the multimedia services to all IP enabled devices. Although SIP's primary objective was meant for multimedia sessions, its scope may be extended to presence, gaming, and IM, as well. Numerous applications can be implemented using SIP, allowing the combination of traditional telephony with messaging and multimedia. For example, SIP can enhance the concept of caller identification from one of simply displaying the number of the calling party to terminal 108, for example, to one of rich content identification. The calling party may, for example, display his personalized logo or business card information to terminal 108 and deliver the subject of the pending call in text, video, or picture format, depending upon the capabilities of terminal 108.

The wireless terminal 108 may represent any of a number of ALL-IP mobile communication devices, such as a cellular telephone 114, a personal digital assistant (PDA) 116, a notebook or laptop computer 118, or any other type of ALL-IP wireless terminal represented by device 120. 3G Radio Access Network (RAN) 132 represents a combination of all mobile radio standards, such as Global System for Mobile Communications (GSM)/Enhanced Data Rates for Global Evolution (EDGE) and Wideband Code Division Multiple Access (WCDMA). Each mobile radio standard having its own distinct network architectures and transport mechanisms that are fully integrated using the IP protocol, where Serving General Packet Radio Service (GPRS) Support Node (SGSN) 130 and Gateway GPRS Support Node 140 provides the RAN interface to ALL-IP core 112.

Network 144 provides WLAN, Digital Subscriber Line (DSL), and cable access to ALL-IP core 112 by Remote Access Server (RAS) 142. RAS 142 may include, for example, a Digital Subscriber Line Access Multiplexer (DSLAM) or a cable head end controller. To provide access to ALL-IP core 112 over a cable network, a head-end controller device (not shown) within RAS 142 connects to an IP router (not shown) that sends and receives the data from ALL-IP core 112. The controller interprets the data it receives from individual customers and keeps track of the services offered to each of them. The controller also modulates the data received from ALL-IP core 112 so that the head-end equipment can send it to a specific cable subscriber within network 144.

ALL-IP system 100 supports Legacy Cellular systems 104 that offers communication support to non ALL-IP terminal 102, for example. Signaling gateway 122 performs all necessary Signaling System No. 7 (SS7) and Mobile Application Part (MAP) signaling conversions as necessary to provide SS7 over IP access from PSTN 124 and MAP over IP access from Legacy Cellular system 104 to ALL-IP core 112. In addition, signaling gateway 122 provides Short Message Service Center (SMSC) support and Multimedia Message Service Center (MMSC) support for any SMS and MMS operations as required by mobile terminal 102.

Internet 138 access from ALL-IP core 112 is provided through internet gateway 136 to allow accesses defined by Uniform Resource Locator (URL) and Uniform Resource Identifier (URI) address definitions. Home Subscriber Server (HSS) 128 provides ALL-IP core 112 with the many database functions that are required in ALL-IP networks. HSS 128, for example, includes Home Location Register (HLR) and Domain Name Server (DNS).

Service capability servers 106 provide consumer applications and services that are not easily provided within the circuit switched or packet core networks by themselves. Service groups having major relevance in 3G ALL-IP networks include information and entertainment content providers, communication, productivity enhancing services and business solutions. Accordingly, services that are timely, personalized, simple to complete, and location specific are provided to all consumers of ALL-IP system 100.

Authentication server 134 provides localized identification, authentication, and authorization functions for any terminal having access to ALL-IP core 112. Authentication server 134 is hierarchically attached to ALL-IP core via, for example, the IP, SIP, EAP, or HTTP stacks and it provides the required authentication mechanisms depending upon the bearer's capability used at any particular instant. Authentication server 134 performs the multiple algorithms and creation of the appropriate messages that encapsulate the results of those algorithms depending on the protocol that requested the authentications. For example, if authentication is requested from a WLAN access point, e.g., RAS 142, authentication server 134 receives information about the algorithm and protocol and will return the security tokens formatted into the indicated protocol, such as the Extensible Authentication Protocol (EAP).

Similarly, if the requesting protocol is SIP, authentication server 134 accesses the SIM information, either directly or via a SIM server (not shown), and performs the appropriate calculation for obtaining the integrity and confidentiality keys requested by the IMS. The integrity and confidentiality keys are then formatted into the correct SIP structure that is included in the SIP header. Alternately, if authentication is requested via a SIP procedure for accessing services provided within ALL-IP core 112, then calculation of the security credentials may involve a different algorithm and the results would involve a different structure that would be placed into the SIP header.

Figure 2:
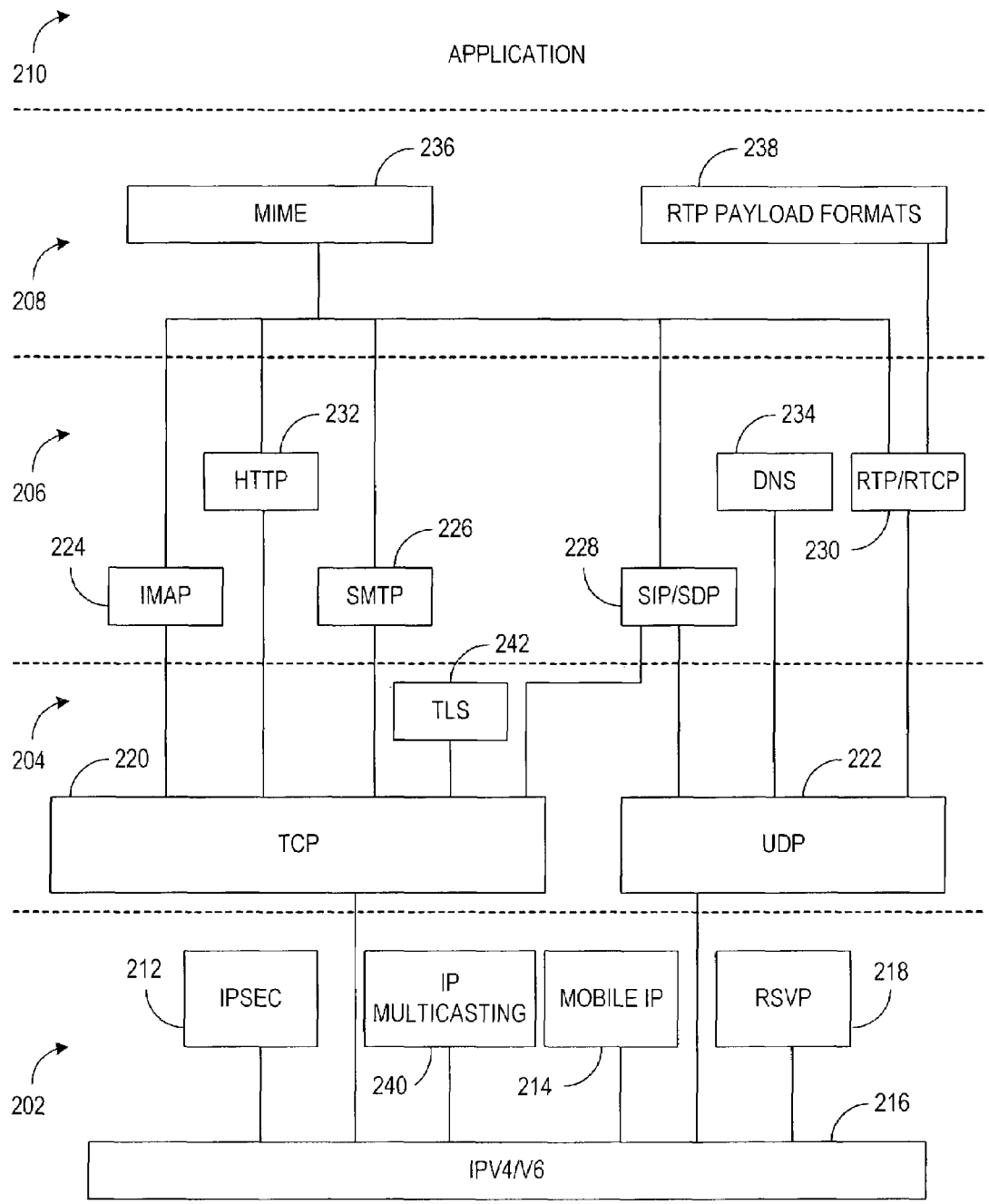
FIG. 2 illustrates an IP based protocol stack utilized by the system architecture of FIG. 1.

SIP enabled call/authentication control within ALL-IP system 100 is provided by CSCF 110, where SIP is hierarchically located in the session layer of the Open System Integration (OSI) model of protocol stack communication. FIG. 2 illustrates SIP and related protocols as they are hierarchically related within the Internet Multimedia Architecture (IMA) as defined by the Internet Engineering Task Force (IETF). Internet layer 202 resides at the bottom of the IMA layered protocol stack above the physical layer (not shown). A portion of Internet layer 202 is comprised of IP layer 216, e.g., IPv4 or IPv6, which runs over every network technology and provides the basic connectionless, packet delivery service for any layer above it. Included with the IP layer is a mobility mechanism, Mobile IP 214, which allows mobile terminals to move freely between different mobile networks. Mobile IP 214 hides the changes in the point-of-attachment to the network from the layers above. Mobile IP 214 also enables mobile devices to receive IP packets via their home networks regardless of which network they happen to be roaming in at the time.

A multicasting agent, IP Multicasting 240, also resides within the IP layer which allows, for example, a mobile subscriber to deliver a packet simultaneously to multiple receivers, easing the scalability of large conferences or media streaming. Security is also provided within the IP layer, i.e., IPSec 212, which provides confidentiality and integrity protection for all traffic. RSVP 218 is a signaling protocol for flow state establishment. A flow is a stream of packets classified by a flow classifier where each packet is subject to a queuing policy. Each packet may be considered individually, for example, to check their conformance to the bandwidth limit associated with each packet in the packet stream.

Above the IP layer resides transport protocol layer 204, which operates end-to-end between hosts or terminals. Exemplary transport protocols include Transmission Control Protocol (TCP) 220 that allows connection-oriented reliable delivery with congestion control and retransmission for data recovery. Another transport protocol is User Datagram Protocol (UDP) 222, which allows a connectionless datagram service where connection setup is not needed or when overhead should be reduced. Another transport within transport layer 204 is the Stream Control Transmission Protocol (SCTP) (not shown) which provides connection-oriented service to multiple interfaces/IP addresses. SCTP allows multiple streams to avoid head of line blocking and is also message oriented, so that protocols running on top of SCTP do not need to worry about message alignment. Transport Layer Security (TLS) 242 provides communications privacy over connection-oriented transport protocols. TLS 242 allows one or both of the end points to be authenticated with certificates and provides keys enabling encryption of all the data in the transport connection. A common use for TLS 242 and its predecessor, Secure Sockets Layer (SSL), is to secure Web transactions.

Above transport protocol layer 204 resides session protocol layer 206. HTTP 232 performs session control for browsing and enables management of transport layer connections for content transfer. The connections are addressed either to a proxy HTTP server or directly to the server identified by the host part of the Uniform Resource Locator (URL). E-mail type store and retrieve messaging sessions are managed with Simple Mail Transfer Protocol (SMTP) 226 and the Internet Message Access Protocol (IMAP) 224. Layers above transport layer 204 can utilize the Internet Domain Name System (DNS) to translate mnemonic names to numeric addresses required by those layers. Voice and other multimedia content, such as video or animation for example, are transported by Real-Time Transport Protocol/Real-Time Transport Control Protocol (RTP/RTCP) 230, which runs on top of UDP transport 222. RTP/RTCP 230 also offers synchronization of data streams it carries by including a sequence number and a timestamp header.

Session Initiation Protocol/Session Description Protocol (SIP/SDP) 228 is utilized for instant messaging and rich call session control. SIP/SDP 228 facilitates end-to-end capability negotiation for real-time multimedia communication sessions, where the real-time media is transported over RTP with the aid of RTP/RTCP 230. Addressing for SIP sessions is based on the SIP URLs. SIP user agents are reachable through their registration to the rich session control element in the home network, which is identified by the domain portion of the consumer's SIP URL. Real time transport resources are managed independently by each session participant for his or her own access network.

Presentation layer 208 comprises Multipurpose Internet Mail Extensions (MIME) 236, which defines the rules for labeling and transmission of different data types within SMTP messages and their attachments. MIME 236 also forms the basis for the transmission of streaming data, such as audio and video messages. RTP Payload Formats 238 supports grouping of payload types for specific applications, such as for audio/video conferencing. Payload types identify specific codecs, such as for Moving Pictures Expert Group Version 4 (MPEG-4) streams, or Enhanced Variable Rate Codec (EVRC) speech. Application layer 210 is situated on top of the transport and session layer protocols, providing the various mobile applications with basic application domain independent services, such as user interface, application inter-working, and service access security.

The protocol hierarchy of FIG. 2 should be largely encompassed by software architectures that are employed to facilitate internet telephony. Internet telephony consists not only of transmitting speech over packet-based networks, but also includes many other aspects of communications: easy-to-remember addressing, user and service mobility, network presence, instant messaging, and multimedia. In addition to peer-to-peer communications, seamless integration with Web browsing and real-time multimedia streaming are needed for a rich user experience.

Figure 3:
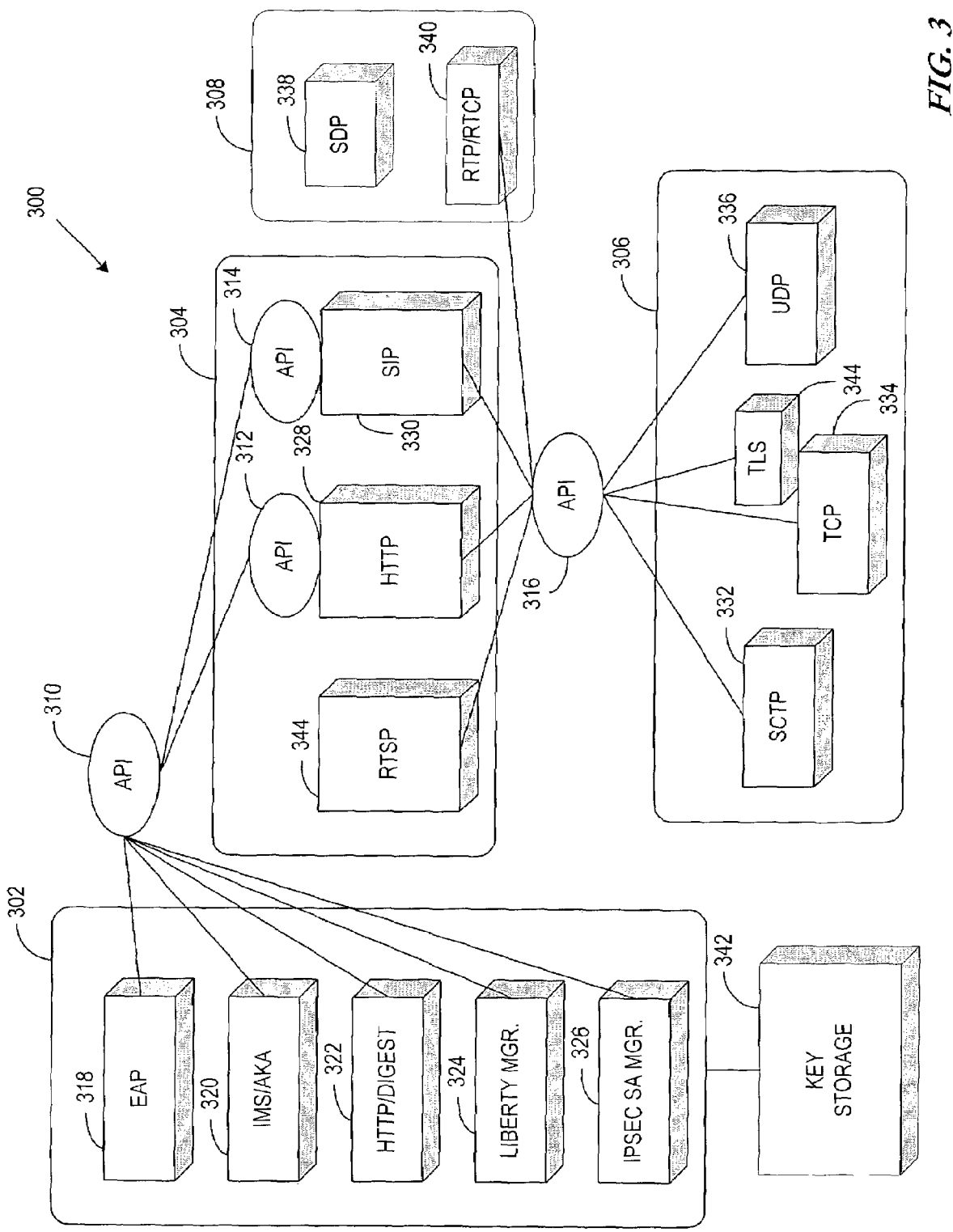
FIG. 3 illustrates an exemplary software architecture capable of performing authentication procedures according to the present invention.

FIG. 3 illustrates software architecture 300 that encompasses many of the protocols illustrated in FIG. 2 and also provides authentication module 302 arranged for use according to the present invention. Basic internet telephony protocol SIP 330 is incorporated into signaling subsystem 304, and basic internet telephony protocols SDP 338 and RTP/RTCP 340 are incorporated into media subsystem 308. Other protocols such as Real-Time Streaming Protocol (RTSP) 344 and HTTP 328 are included in signaling subsystem 304 as they are needed when providing rich multimedia services.

Communications subsystem 306 incorporates the operating system abstraction (not shown) and transport protocols SCTP 332, TCP 334, UDP 336 and TLS 344. Application Programming Interfaces (API) 312-316 supports the end-to-end application environment that includes both server side and terminal side application environments. On the terminal side, the application environment includes the APIs provided by the terminal. The standard, easy to use APIs allow developers to write applications once and run them easily in a large variety of terminals compliant with the endorsed standards. Use of technologies, such as Java 2 Micro Edition (J2ME), make it possible for developers to write applications that automatically adapt to different types of mobile devices, screen sizes, colors, and other device properties. On the server side, software architecture 300 includes the APIs provided by the Service Provisioning Infrastructure (SPI), which includes the software for hosting applications and content. Portability across multi-vendor SPIs and different hardware platforms is a major benefit that is provided by the APIs.

Authentication module 302 and associated API 310 provides a centralized authorization and authentication function according to the present invention. Various authentication mechanisms, e.g. 318-326, are contained within authentication module 302 and they are invoked depending upon the bearer mechanisms requesting them. For example, if authentication is requested from a WLAN network 144 via RAS 142 in FIG. 1, then authentication module 302 receives information about the algorithm and protocol and returns security tokens formatted according to the requirements of WLAN network 144. Alternately, when the protocol requesting the authentication is SIP, authentication module 302 accesses the required SIM information from key storage 342 and then performs the appropriate calculation for obtaining the integrity and confidentiality keys.

In case the authentication module is unable to identify the specific authentication mechanism required, or is unable to access the required user information, e.g., security credentials, authentication module 302 will return an error notification indicating the reason of the failure. Such failure reasons may include, for example, the inability of authentication module 302 to access SIM information, or the inability to access specific user information that is required by the authentication mechanism of the request, etc. The application or protocol stack that receives the error notification may then treat the error accordingly and prompt the user to supply additional information, or simply just inform the user about the error. It is apparent to one of ordinary skill in the art that actions based on the reported errors from authentication module 302 are implementation dependant and may include any number of options.

IPsec Security Associations (SA) Manager 326 of authentication module 302 uses two protocols to provide traffic security: Authentication Header (AH) and Encapsulating Security Payload (ESP). The IP Authentication Header (AH) provides connectionless integrity, data origin authentication, and an optional anti-replay service. The Encapsulating Security Payload (ESP) protocol may provide confidentiality, e.g., encryption, and limited traffic flow confidentiality. Both AH and ESP are vehicles for access control, based on the distribution of cryptographic keys and the management of traffic flows relative to these security protocols.

IMS/Authentication and Key Agreement (AKA) 320 of authentication module 302 produces an Authentication Vector (AV), based on a shared secret K and a sequence number (SQN). The AV contains a random challenge (RAND), network authentication token (AUTN), expected authentication result (XRES), a session key for integrity check (IK), and a session key for encryption (CK), each of which is contained within key storage 342. The authentication module 302 creates an authentication request, which contains the random challenge RAND, and the network authenticator token AUTN and is then delivered to the requesting client in the format required by the requesting client. Using the shared secret K and the sequence number SQN, the client verifies the AUTN.

If the verification is successful, the network has been authenticated. The client then produces an authentication response RES, using the shared secret K and the random challenge RAND.

The PPP (Point-Point Protocol) Extensible Authentication Protocol (EAP) 318 of authentication module 302 is a general protocol for PPP authentication, which supports multiple authentication mechanisms. EAP 318 does not select a specific authentication mechanism at link control phase, but rather postpones the selection until the authentication phase. This allows API 310 to request more information before determining the specific authentication mechanism. After the link establishment phase is complete, authentication module 302 sends one or more requests to authenticate the client. The request has a type field to indicate what is being requested. Examples of request types include Identity, Message Digest 5 (MD5) challenge, One-Time Passwords, Generic Token Card, etc. Typically, authentication module sends an initial identity request followed by one or more requests for authentication information. However, an initial identity request is not required, and may be bypassed in cases where the identity is presumed, e.g., leased lines, dedicated dial-ups, etc. The client sends a response packet in reply to each request. Authentication module 302 ends the authentication phase with a success or failure packet.

Liberty Manager 324 of authentication module 302 specifies mechanisms for achieving identity federation, single sign-on, termination of identity federation, as well as single logout. When a single sign-on service is made available, for example, a user who has already authenticated himself with one service provider, need not authenticate himself with a second service provider. Instead, the sign-on at the first service provider lends itself to the second service provider, thus allowing a single sign-on. Liberty manager 324 separates the message schemas from their associated profiles and bindings. Message schemas are proposed for the single sign-on and federation protocol, the federation termination notification protocol, as well as the single log-out protocol. Associated with the single message schema, liberty manager 324 specifies several profiles and bindings. Depending on the particular scenario, the appropriate liberty profile may be applied. Such scenarios include cases where the client is using either a Web browser, a Wireless Application Protocol (WAP) browser, or a liberty-enabled browser.

HTTP/Digest 322 of authentication module 302 is based on a simple challenge-response paradigm. The digest scheme challenges by using a nonce value. The response contains a checksum, e.g., MD5 checksum of the username, password, the given nonce value, the HTTP method, and the requested URI. In this way, the password is never sent in the clear. HTTP/Digest 322 utilizes modified WWW-Authenticate and WWW-Authorization headers along with the WWW-Authentication-Info header to perform authorization on requests for access-protected objects. It should be noted that the authentication mechanisms are not limited only to those illustrated to be within authentication module 302. It is apparent to one of ordinary skill in the art that other mechanisms such as HTTP/Basic or Kerberos, for example, may also be implemented within authentication module 302.

According to one embodiment of the present invention, authentication module 302, key storage 342, and API 310 are each co-located within a SIM server, user security profile storage, or other implementation specific storage for secure user information, e.g., Pretty Good Privacy (PGP) ring, etc., such as may be exemplified by authentication server 134 of FIG. 1. In such an instance, authentication server 134 provides local access to SIM information and other algorithm data within the same platform, in order to perform the correct calculation regardless of the requesting entity. The different applications installed on authentication server 134 register their respective security algorithms, protocols and credentials that are required for performing each authentication procedure. In another embodiment according to the present invention, authentication server 134 is separated from the SIM server, but maintains a security channel that is compliant with the Target of Evaluation (TOE) specifications from the European Union (EU) commission.

The specific modules that perform the authentication procedure within authentication module 302 should register their API to the authentication module in a plug in approach. Initially, for example, authentication module 302 may perform an older version of Liberty Alliance Identity checking, but when new versions are available, authentication module 302 may incorporate a new plug in that will perform the newest version of Liberty Alliance. Thus, new security modules could be embedded within authentication module 302, thus requiring that the modules be trusted, e.g., appropriately certificated in order to ensure that the module is legitimate and can be incorporated to the authentication module. Similarly, the applications requesting authentication service from authentication module 302 should be checked for legitimacy, where the channel between the applications and the authentication module is secure and tamper resistant by TOE standards.

Authentication server 134, employing authentication modules 318-326, provides generic IP authentication to ALL-IP system 100 according to the present invention. Any protocol requiring authentication prior to its access of ALL-IP system 100 is able to initiate an authentication algorithm according to its particular protocol. Once initiated, API 310 of FIG. 3 passes the request to the authentication server, which recognizes the authentication algorithm required to process the request. API 310 then accesses the required authentication module as necessary and transacts the authorization/authentication session to completion. Any signaling protocols in use by ALL-IP system 100 may be accepted by authentication server 134, where the signaling protocols include, but are not limited to, SIP, HTTP, RTP and IP via WLAN.

In accordance with an exemplary mode of operation, authentication server 134 provides SIP authentication support using SIP digest, plain text and AKA procedure. The authentication server may also provide an authorization token that may be requested by the SIP protocol to be included in the SDP messages for media authorization. SIP messages have substantially the same structure as HTTP messages, and contain a request line or status line followed by at least six header fields. SIP supports the Multi-Purpose Internet Mail Extension (MIME) for describing the content in the message body. In most cases, the message body consists of an SDP message that describes the media transfer after the call setup signaling is completed. The SDP message has a MIME subtype of application/sdp and other MIME subtypes such as text/plain or image/gif may also exist within the message body. The SDP also contains a "k=" parameter that allocates security information used for authorizing the media transaction or access to the service specified in the SDP message.

All requests from a SIP User Agent (UA) contain a method in the request line as shown in Table 1. The response from a UA server has the same structure as in HTTP responses and contains response codes that belong to one of six response code classes that are listed in Table 2. Other SIP applications that can handle SIP messages include proxy servers, redirect servers, registration servers, and gateways. Proxy servers

TABLE 1

| METHOD NAME | DESCRIPTION |
|---|---|
| INVITE | Invites UA server to a call and establishes a new connection. Media capabilities may also be contained within the message. |
| ACK | Used to acknowledge a received INVITE request. |
| BYE | Terminates the media session between two UAs. |
| REGISTER | Used for registering information about a UA client's location. |
| CANCEL | Terminates a non-acknowledged invitation. |
| OPTION | Used to get information about supported capabilities. |
| MESSAGE | Used to exchange messages and may include plain text or MIME types. |
| UPDATE | Used for media negotiation and may include SDP with media authorization data. |
| SUBSCRIBE | Used to subscribe to certain events. |
| NOTIFY | Used to notify about certain events. |

TABLE 2

| CLASS | DESCRIPTION |
|---|---|
| 1xx | Provisional or informational: Request is progressing, but not yet complete. |
| 2xx | Success: Request has completed successfully. |
| 3xx | Redirection: Request should be tried at another location. |
| 4xx | Client error: Request was not completed due to error in request, can be retried when connected. |
| 5xx | Server error: Request was not completed due to error in recipient, can be retried at another location. |
| 6xx | Global failure: Request has failed and should not be retried again. | have the task of forwarding the request from the UA client to the SIP address specified in the SIP message. Proxy servers also have the ability to modify portions of the SIP message, e.g., the Via header field. Proxy servers may also require authentication prior to forwarding the SIP message to the intended recipient.

Figure 4:
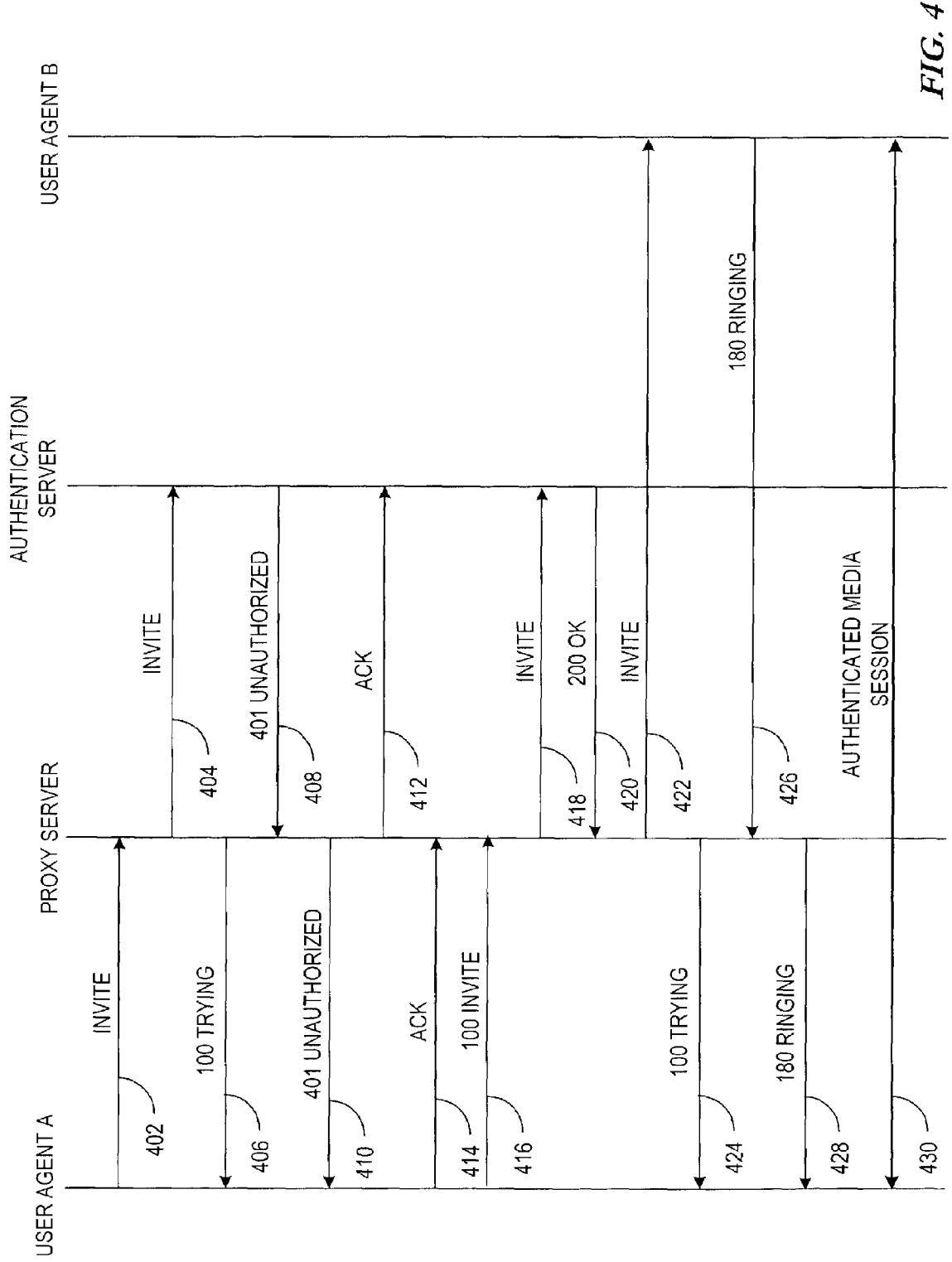
FIG. 4 illustrates an exemplary message flow diagram according to the present invention.

In particular, the message flow diagram of FIG. 4 illustrates an exemplary SIP Digest authentication message flow between, for example, SIP enabled lap top computer 118 and authentication server 134 of FIG. 1. The message exchange is used to ultimately establish an authenticated media session between lap top computer 118 and service capability server 106. Authentication server 134 is utilized to support SIP Digest authentication, whereby the authentication module 302, API 310 and key storage 342 are each co-located within authentication server 134. User Agent A in FIG. 4 represents SIP enabled lap top computer 118 of FIG. 1, User Agent B in FIG. 4 represents service capability server 106 of FIG. 1, and Authentication server in FIG. 4 represents authentication server 134 of FIG. 1. Once User Agent A has been authenticated, the media session is allowed to progress between User Agent A and User Agent B.

User Agent A sends an INVITE message to its designated proxy server (not shown) via message 402. The INVITE message, however, contains no authorization credentials, but is forwarded anyway to authentication server 134 via message 404. The proxy server submits a 100 TRYING message back to User Agent A via message 406 to indicate call set-up progression. API 310 executing on authentication server 134 detects that a SIP INVITE message is pending and, therefore, invokes HTTP/DIGEST module 322 to support the authentication session. Since the INVITE request submitted by user agent A attempts to access a restricted domain within User Agent B, authentication server 134 provides a 401 UNAUTHORIZED challenge via message 408 to the proxy server. The proxy server then proxies the 401 UNAUTHORIZED challenge to User Agent A via message 410. Each 401 UNAUTHORIZED challenge is acknowledged via ACK messages 412 and 414.

The 401 UNAUTHORIZED challenge message from authentication server 134 contains the WWW-Authenticate header field as described in Table 3. User Agent B may have several protected domains and, therefore, the realm field specifies the challenge for the specific protected domain within User Agent B. The realm value cannot be excluded because the User Agent A's credentials are based on it. The optional domain field specifies each URI that is a party to the specific protected domain within User Agent B. The nonce value is important because it specifies the current challenge. The format of the nonce value is implementation dependant with the restriction that it should be unique. The nonce value is effective against replay attacks when used in conjunction with the stale parameter. In such an instance, if the nonce value is changed for each new request, then the stale parameter may be set to indicate a rejected message due to a stale nonce value. The algorithm parameter is an optional parameter which may be used to specify which algorithm is to be used for checksum calculations, e.g., MD5. The qop-options parameter is optional depending upon backward compatibility with older versions of Digest authentication. It should be used, however, because it

TABLE 3

| NAME OF PARAMETER | DESCRIPTION |
|---|---|
| realm | String associated with the protection domain. |
| domain (optional) | List of URIs that define the protection domain. |
| nonce | Unique string that is created by the server for each 401 response. |
| opaque (optional) | A string of data specified by the server which should be returned by the client unchanged. |
| stale (optional) | A flag that specifies if the previous request from the client is rejected because the nonce was stale. |
| algorithm (optional) | Specifies the algorithm to use for the checksum calculations. |
| qop-options (optional) | Specifies the quality of protection that the server supports. It can either be "auth-int" or "auth" depending on the server's capabilities. |
| auth-param (optional) | Future extensions. | provides mutual authentication and some message integrity protection. The mutual authentication means that authentication server also has to verify that it knows the username and password for User Agent A. If the qop-options="auth-int", then both authentication and message integrity protection is used. If the value is "auth", then only authentication is used. It is important to note that if authentication server 134 to User Agent A authentication is used, it is done with the Authentication-Info header field.

When User Agent A receives the 401 UNAUTHORIZED challenge via message 410, it uses its password and some of the parameters contained within the WWW-Authenticate header field to calculate the checksum. The checksum is then included in the response portion of the Authorization header field as illustrated in Table 4. An exemplary

TABLE 4

| NAME OF PARAMETER | DESCRIPTION |
| --- | --- |
| username | Client's username for specified realm. |
| realm | String associated with the protection domain. Must contain the same value as the realm value of the 401 UNAUTHORIZED response from authentication server. |
| nonce | Unique string that is created by the authentication server for each 401 response. Should contain that same value as the nonce value in the 401 response from the authentication server. |
| digest URI | The URI from the request URI of the request line. |
| response | The calculated checksum that is hexadecimal encoded. |
| algorithm (optional) | Specifies the algorithm to use for the checksum calculations. |
| cnonce (optional) | If the qop-options in the received 401 response is not empty, this value is used by the authentication server to authenticate itself to User Agent A by using the Authentication-Info header field. The value is generated by the client and it should be unique. If the qop-options is empty in the received 401 response, then this value must not be used. |
| opaque (optional) | A string of data specified by the authentication server that should be returned by User Agent A unchanged. |
| message-qop (optional) | Specifies the quality of protection that User Agent A has applied to the message. It must be equal to one of the qop-options values specified in the 401 response from the server. |
| nonce count (optional) | Specifies the number of requests that have used the nonce specified in this header field. |
| auth-param (optional) | Future extensions. |

Authorization header field with credentials that is included in the INVITE message 416 is illustrated in Table 5.

The first line of the SIP message shown in Table 5 does not contain headers, but starts with the name of the method, e.g., INVITE, followed by the INVITE URI, e.g., "sip: userB@domain.com", which is the destination address of the message. The current version of SIP used then follows, e.g., version 2.0. The next line of Table 5 displays the Via header, which also indicates the SIP version and transport mode, e.g., TCP, followed by the host name, e.g., "userA@domain.com", of the originator of the message followed by the originator's port number, e.g., 5060. Each server that forwards the message enters its own forwarding address, e.g., "sipproxy.domain.com", to the header as well as its designated port number. Any responses as a result of the message then are able to follow the Via path, thus obviating the need for address resolution in the reverse direction.

Next, the To/From headers display the display name, e.g., UserB/UserA, and the URL of the destination/origination enclosed in brackets < >. The Call-ID header contains a unique identifier for the current call. All subsequent requests and responses during the call will contain the same unique identifier. CSeq represents the command sequence number of the current command, followed by the request method, e.g., INVITE. Each successive request or response will have a higher CSeq number, where the called and calling parties each maintain there own CSeq counts. The Authorization header field follows (as defined in Table 4), where the response portion contains User A's response to the challenge presented by authentication server 134. The INVITE response message is proxied to authentication server 134 via message 418. Authentication server 134 then compares User A's response by calculating its own checksum using the parameters sent to User A in message 410. If the checksum value matches User A's response value, then User A is authenticated to access the protected domain within User B and access is granted by the 200 OK message sent via message 420.

Since authentication server 134 is trusted by User Agent B, the INVITE message illustrated in Table 5 is proxied to User Agent B via message 422 and is signaled as progressing through 100 TRYING message 424. User Agent B provides 180 RINGING message 426 to the proxy server, which is then

TABLE 5

| LINE | DESCRIPTION |
| --- | --- |
| INVITE sip:userB@domain.com SIP/2.0 | Method = INVITE; SIP URI = sip:userB@domain.com SIP Version = 2.0 |
| Via:SIP/2.0/TCP userA@domain.com 5060; branch = sipproxy.domain.com 5061. | Originator = userA@domain.com at port 5060 Forwarding server = sipproxy.domain.com at port 5061 |
| To: User B <sip: userB@domain.com> | Display Name = User B Destination URL = <userB@domain.com> |
| From: User A <sip: userA@domain.com> | Display Name = User A Origination URL = <userA@domain.com> |
| Call-ID: asd88asd77a@1.2.3.4 | Unique Identifier = asd88asd77a Globally Unique IP Address = 1.2.3.4 |
| CSeq: 1 INVITE | Command Sequence Number = 1 Request Method = INVITE |
| Authorization: Digest username = "User A", realm = "User B", nonce = "e288df84f1cec434lade6e5a359", digest URI = "sip:userB@domain.com", response = "1d19580cd833064324a787ecc", algorithm = " ", cnonce = " ", opaque = " ", message-qop = " ", nonce count = " ", auth-param = " " | Authorization header field as defined in Table 4 | proxied to User Agent A via message 428. After several handshaking messages occur (not shown), the authenticated media session commences as in message 430.

It should be noted that the authentication service that is provided in accordance with the present invention, contemplates both an apparatus that may reside within the proxy server, as part of the proxy server or collocated with the proxy server, and an apparatus included in the terminal, e.g. user agent A, for providing multiple authentication mechanisms that may be required in the terminal. When considering the authentication service provided in the terminal, it can be implemented as any other support module, such as the keyboard server that receives all the inputs from the keyboard and passes it to the application that is running. When any application running on the terminal requires calculation of some authentication procedure: it contacts the authentication server through the authentication server's API; the authentication server then calculates the necessary credentials; and then returns them to the application running on the terminal.

Similarly, the same authentication procedure applies when the authentication server is implemented as a module collocated with the proxy server, as depicted for example, by the message flow of FIG. 4. The proxy server receives a message, e.g. SIP or HTTP, from the terminal and then authenticates the message through the use of the authentication server. The proxy server passes the content included in the Authorization header to the authentication server. The authentication server then determines the authentication mechanism to be used for performing the authentication, calculates the security information, and passes it back to the proxy server via, for example, the WWW-Proxy Authorization header contained within the 401 Unauthorized response that will be sent to user agent A. The communication between the proxy server and the authentication server may be implemented using any specific API configured to transfer the messages, e.g., INVITE, 401 Unauthorized, etc., as indicated in FIG. 4. The communication may also be implemented using any proprietary communications channel that only includes the content of the headers in those messages. In any case, the authentication server's API should communicate with the proxy server via a TOE compliant secure channel.

The authentication service according to the present invention is offered either on the client side in response to the received authentication requests from the network elements, or on the network side. When the authentication service is operating on the network side, the authentication server provides the authentication service to a network element that is being accessed by a client, who must first be authenticated. In that case, the network element receives the attempt to access the network from another user supplying his own security credentials, and then forwards them to the authentication server for validation. The authentication server will insure that the security credentials provided are correct according to the specific authentication protocol selected for the process.

The message flow diagram of FIG. 4 illustrates SIP Digest authentication that is recognized by API 310. API 310 then invokes HTTP/DIGEST 322 to support the authentication protocol as required by SIP enabled terminal User Agent A. It is apparent to one of ordinary skill in the art that the number of authentication mechanisms supported by API 310, key storage 342, and authentication module 302 is limited only by the number of authentication mechanisms executing within authentication module 302. Therefore, the authentication services offered by the present invention may be added as necessary to support the particular application.

In one embodiment according to the present invention, for example, a non-SIP scheme of transaction security is required at the transport layer. IPsec SA Manager 326 of authentication module 302 is invoked to interact with the corresponding IPsec layer of its communication peer. In such a case, API 310 recognizes that an IP-layer security scheme is desired, where encryption and signing of IP packets is implemented to support secure transmission across ALL-IP system 100 of FIG. 1.

In another embodiment according to the present invention, SIM authentication is supported by authentication server 134, whereby Virtual Private Network (VPN) certificates may be kept by key storage 342. In such an instance, the VPN certificates are used for WLAN authentication, whereby the 802.11 b standard provides link level authentication between stations. In addition, authentication server 134, in conjunction with the 802.11b authentication standards of the WLAN, supports shared key authentication with the Wired Equivalent Privacy (WEP) option.

Figure 5:
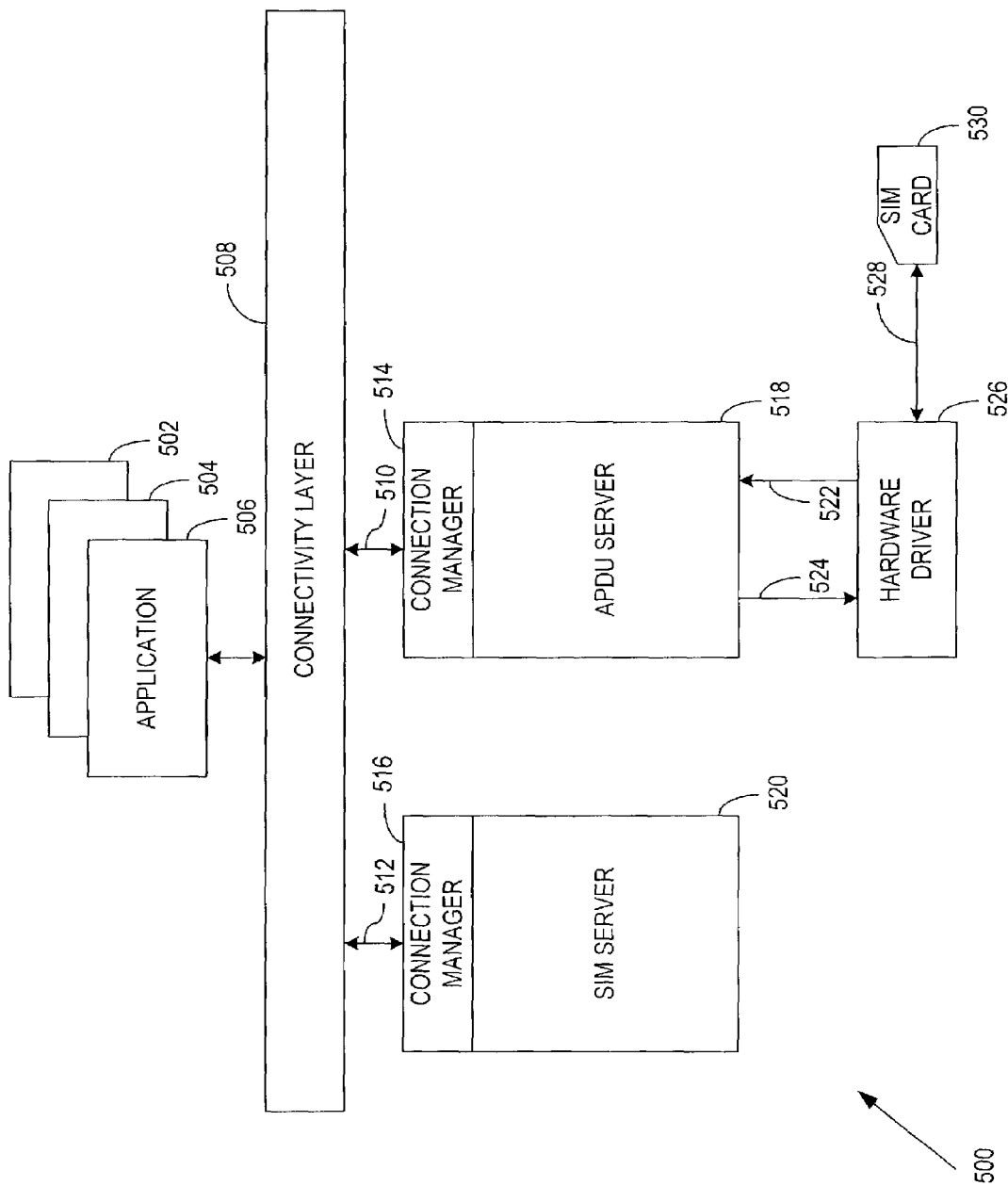
FIG. 5 illustrates an exemplary computer architecture to support SIM authentication according to the present invention.

In order to provide the necessary key, certificate and signature information to support the various authentication mechanisms, a local repository of SIM data is defined to exist in accordance with the present invention. FIG. 5 illustrates one embodiment of computer architecture 500 used to implement this repository of SIM data. SIM card 530 provides the capability to create crypto keys and enhance security for mobile transactions by providing subscriber authentication and encryption for mobile communications. By moving the storage of the subscription parameters away from the mobile terminal to SIM card 530, and eventually to SIM server 520, a robust, secure method of communication is facilitated.

Hardware (HW) driver 526 facilitates information transfer from SIM card 530 to APDU server 518 via serial link 528. The information is transferred via data records called Application Protocol Data Units (APDU), the format of which is illustrated in Table 6.

TABLE 6

| CODE | NAME | DESCRIPTION |
|------|------|-------------|
| CLA | Class | Class of instruction |
| INS | Instruction | Instruction code |
| P1 | Parameter | Instruction Parameter #1 |
| P2 | Parameter | Instruction Parameter #2 |
| P3 | Parameter | Instruction Parameter #3 |
| Lc | Length | Number of bytes present in the data field of the command |
| DATA | Data | String of bytes sent in the data field of the command |
| Le | Length | Maximum number of bytes expected in the data field of the response to the command |

"CLA" is a one byte field that indicates to what extent the data unit complies with International Organization for Standardization/International Electrotechnical Commission (ISO/IEC) 7816 and when applicable, the format of secure messaging and the logical channel number. "INS" is a one byte instruction code associated with the APDU and it indicates the command initiated by the APDU. Exemplary actions initiated by the INS code are: "SELECT FILE"; "READ RECORDS"; "GET DATA"; and "PUT DATA" to name only a few. Parameters P1-P3 are one byte fields that may contain any value associated with the "INS" instruction code.

Links 522 and 524 represent APDU flow via Operating System (OS) messaging between HW driver 526 and APDU server 518. Connection manager 514 connects to connectivity layer 508 via path 510 and encapsulates the APDU message received from SIM card 530 into an ISI message. Once encapsulated, the ISI message may transfer to connection manager 516 of SIM server 520 via path 512. The data portion of the APDU encapsulated within the ISI message may then be stored within SIM server 520 for subsequent access by applications 502-506. Applications 502-506 may represent any application executing on authentication server 134 of FIG. 1, for example, that requires access to SIM data in support of authentication module 302 of FIG. 3.

Figure 6:
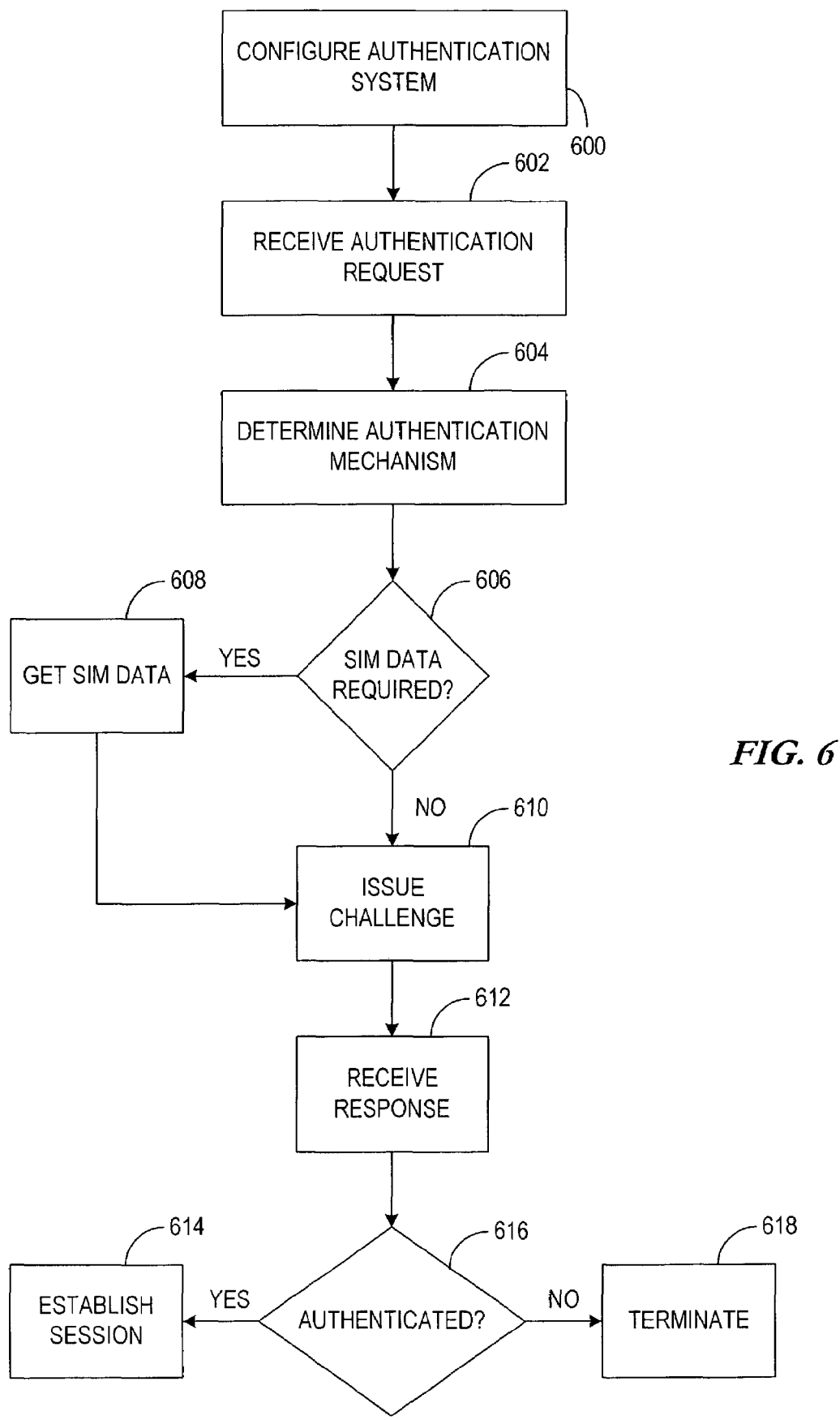
FIG. 6 illustrates a flow diagram of generic authentication according to the present invention.

A generic authentication method is thus implemented by the present invention in which any number of protocols may complete an authentication session no matter what authentication mechanism is being employed by the protocol. In particular, FIG. 6 illustrates an exemplary flow diagram of such a generic authentication method. Configuration of an authentication system as in step 600 comprises as a first step, loading SIM data into, for example, SIM server 520 of FIG. 5 via APDU server 518. As a second step, authentication modules such as those illustrated in authentication module 302 of FIG. 3, e.g., EAP 318, IMS/AKA 320, HTTP/Digest 322, Liberty Manager 324, and IPsec SA Manager 326, are installed on SIM server 520 and brought on-line. As a third step, the authentication mechanisms of authentication module 302 are registered so that the security algorithms, protocols, and credentials that are required for performing each authentication procedure may be known by prospective clients of the authentication system.

In operation according to the principles of the present invention, an authentication request is received in step 602. The authentication request may use any IP based authentication protocol previously registered in step 600. The receiving API, e.g. API 310 of FIG. 3, determines the authentication mechanism required by the authentication request as depicted at block 604, and invokes the correct authentication mechanism to be used, e.g., modules 318-326 of FIG. 3. If authentication certificates, keys or signatures are required, as in step 606, in order to present a challenge to the request as shown at block 610, the necessary authentication data is retrieved 608 from, for example, SIM server 520 of FIG. 5. Once the response to the challenge is received in step 612, it is compared to an expected response. If the received response is equal to the expected response computed by the authentication mechanism, then the YES path from step 616 is taken, whereby the session being authenticated is established 614. Otherwise, the session is terminated as in step 618.

Using the description provided herein, the invention may be implemented as a machine, process, or article of manufacture by using standard programming and/or engineering techniques to produce programming software, firmware, hardware or any combination thereof. Any resulting program(s) having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create an authentication system, apparatus, and method in accordance with the present invention.

Figure 7:
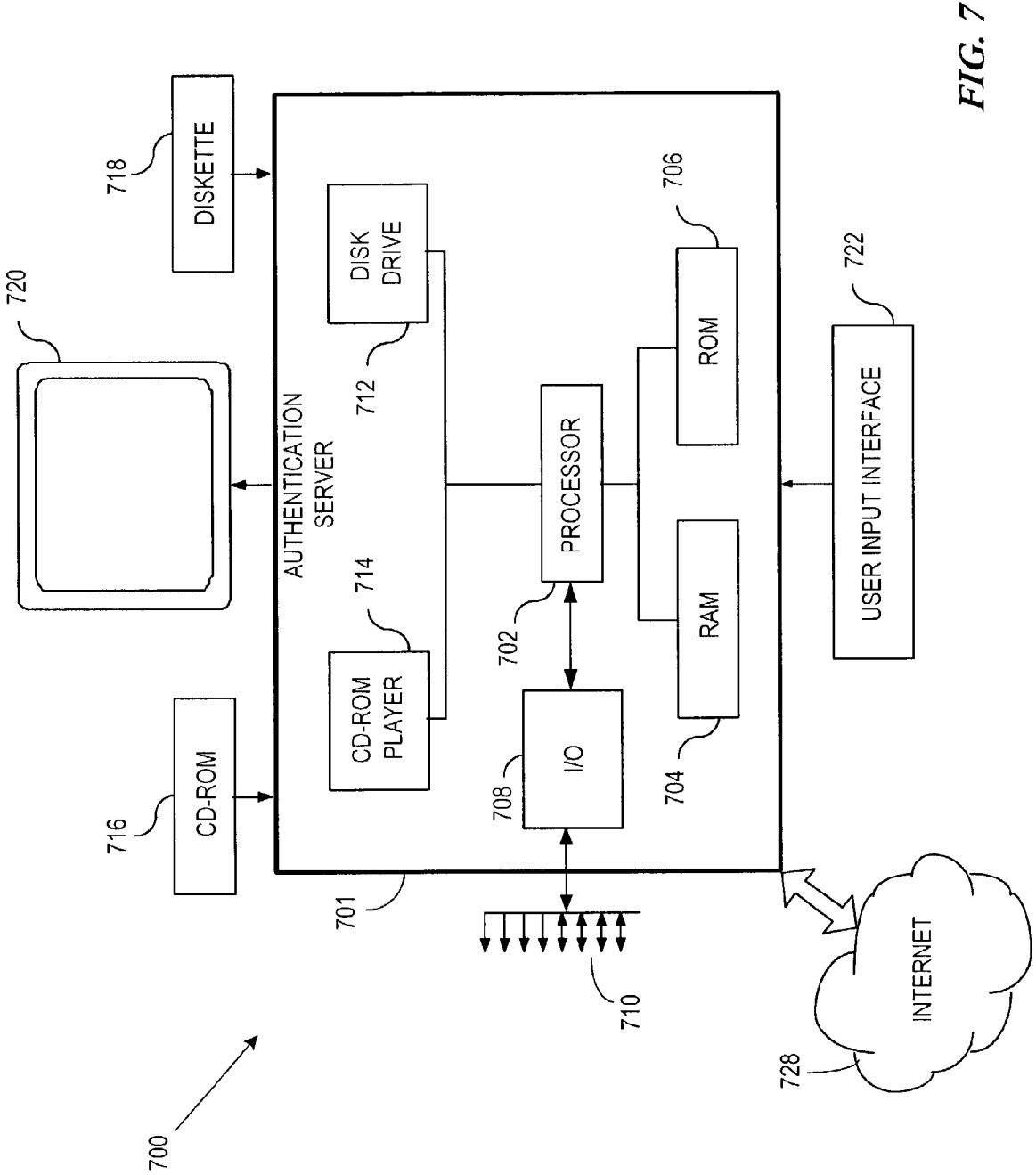
FIG. 7 is a representative computing system capable of carrying out authentication functions according to the present invention.

The network servers or other systems for providing authentication functions in connection with the present invention may be any type of computing device capable of processing and communicating digital information. The network servers utilize computing systems to control and manage the authentication activity. An example of a representative computing system capable of carrying out operations in accordance with the invention is illustrated in FIG. 7. Hardware, firmware, software or a combination thereof may be used to perform the various authentication functions and operations described herein. The computing structure 700 of FIG. 7 is an example computing structure that can be used in connection with such an authentication system.

The example computing arrangement 700 suitable for performing the authentication activity in accordance with the present invention includes authentication server 701, which includes a central processor (CPU) 702 coupled to random access memory (RAM) 704 and read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. For example, a SIP INVITE message such as that exemplified in Table 5 may be received by authentication server 701, which invokes authentication module HTTP/Digest 322 of FIG. 3, to authenticate the Authorization header of the INVITE message. External data storage devices, such as SIM servers, may be coupled to I/O circuitry 708 to facilitate authentication functions according to the present invention. Alternatively, such databases may be locally stored in the storage/memory of the server 701, or otherwise accessible via a local network or networks having a more extensive reach such as the Internet 728. The processor 702 carries out a variety of functions as is known in the art, as dictated by software and/or firmware instructions.

Authentication server 701 may also include one or more data storage devices, including hard and floppy disk drives 712, CD-ROM drives 714, and other hardware capable of reading and/or storing information such as DVD, etc. In one embodiment, software for carrying out the authentication operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to authentication server 701 via data signals, such as being downloaded electronically via a network, such as the Internet. Authentication server 701 is coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The authentication server 701 may be coupled to other computing devices, such as the landline and/or wireless terminals via a network. The server may be part of a larger network configuration as in a global area network (GAN) such as the Internet 728, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method comprising:
   coupling a plurality of network protocol stacks to a generic Application Programming Interface (API) that provides access to a plurality of authentication modules, wherein each of the network protocol stacks supports a different network protocol;
   receiving, via an Internet Protocol (IP) network, an authentication request at one of the network protocol stacks;
   detecting an authentication mechanism associated with the received authentication request, wherein detecting the authentication mechanism is supported by the API of the authentication module;
   selecting, via the API, one of the plurality of authentication modules in response to the detected authentication mechanism;
   accessing, via the API, data that is required to support the authentication module; and
   authenticating the request via the one network protocol stack based on the data accessed via the API.

2. The method according to claim 1, wherein the API is arranged to detect all authentication mechanisms supported by the IP network.

3. The method according to claim 2, wherein the API is further arranged to invoke the authentication module to be used in support of the authentication mechanism.

4. The method according to claim 1, wherein the network protocol stacks comprise at least one of a Hyper Text Transfer Protocol (HTTP) stack, a Session Initiation Protocol (SIP) stack, and a Real-Time Transport Protocol (RTP) stack.

5. The method according to claim 1, further comprising:
   configuring the authentication modules;
   registering the authentication modules with the API; and
   loading the data required to support the authentication modules.

6. The method according to claim 5, wherein loading the data comprises transferring Subscriber Identification Module (SIM) information to a location that is co-located with the authentication modules.

7. The method according to claim 1, further comprising:
   adding a new authentication module to the plurality of authentication modules; and
   registering the new authentication module with the API via a plug-in interface.

8. An authentication system, comprising:
   a plurality of network elements each employing a different authentication protocol, each of the authentication protocols associated with one or more network protocols;
   an authentication server arranged to provide authentication service in response to received authentication requests from the network elements, the authentication server comprising:
      a plurality of network protocol stacks, wherein each of the network protocol stacks supports a different one of the network protocols;
      a generic Application Programming Interface (API) coupled to receive the authentication requests from the network protocol stacks; and
      an authentication module comprising a number of authentication mechanisms coupled to service the authentication requests via the API; and
   a data server comprising:
      a data storage device comprising secure user data; and
      a data interface coupled to the authentication server, wherein the data interface provides the secure user data to the authentication server to support the authentication service; and
   wherein the authentication service performed is selected via the API depending upon the authentication protocol employed by the requesting network element.

9. The authentication system according to claim 8, wherein the network elements are coupled via a common Internet Protocol stack.

10. The authentication system according to claim 8, wherein the plurality of network protocol stacks include at least one of a Hyper Text Transfer Protocol (HTTP) stack, a Session Initiation Protocol (SIP) stack, and a Real-Time Transport Protocol (RTP) stack.

11. The authentication system according to claim 8, wherein the data server is co-located with the authentication server.

12. The authentication system according to claim 8, wherein the data server comprises an interface coupled to receive Subscriber Identity Module (SIM) data.

13. The authentication system according to claim 8, wherein the data server provides a centralized repository for the SIM data.

14. A server, comprising:
   a plurality of network protocol stacks;
   a generic Application Programming Interface (API) coupled to the network protocol stacks;
   a processor; and
   memory coupled to the processor, the memory having instructions that cause the processor to:
      receive, via an Internet Protocol (IP) network, authentication requests having various authentication protocol types from the network protocol stacks;
      detect the various authentication protocol types, via the generic Application Programming Interface (API) coupled to the network protocol stacks;
      invoke an authentication mechanism depending upon the authentication protocol type of the authentication request; and
      access data in support of the authentication requests.

15. The server according to claim 14, wherein the plurality of network protocol stacks include at least one of a Hyper Text Transfer Protocol (HTTP) stack, a Session Initiation Protocol (SIP) stack, and a Real-Time Transport Protocol (RTP) stack.

16. The server according to claim 14, wherein the instructions further cause the processor to transfer the data in support of the authentication into a central repository.

17. The server according to claim 16, wherein the central repository is co-located with the server.

18. A computer-readable medium having instructions stored thereon which are executable by an apparatus by performing steps comprising:
   coupling a plurality of network protocol stacks of the apparatus to a generic Application Programming Interface (API) that provides access to a plurality of authentication modules, wherein each of the network protocol stacks supports a different network protocol;
   receiving, via an Internet Protocol (IP) network, authentication requests having various authentication protocol types from the network elements at one of the network protocol stacks;

detecting the various protocol types via the API;
invoking an authentication mechanism depending upon the authentication protocol type of the authentication request;
accessing, via the API, data in support of the authentication of the network elements; and
authenticating the request via the network protocol stack based on the data accessed via the API.

19. A terminal comprising:
a plurality of network protocol stacks capable of receiving, via an Internet Protocol (IP) network, authentication requests having various authentication protocol types, wherein each of the network protocol stacks supports a different network protocol;
a generic Application Programming Interface (API) coupled to the network protocol stacks and configured to:
  detect the various authentication protocol types of the authentication requests;
  invoke an authentication mechanism depending upon the authentication protocol type of the authentication request; and
  access data in support of the authentication requests; and
wherein the data that is accessed in support of the authentication requests is provided to the network protocol stacks to facilitate servicing the authentication requests.

* * * * *